(12) United States Patent
Sugita et al.

(10) Patent No.: US 11,416,011 B2
(45) Date of Patent: Aug. 16, 2022

(54) PRESSURE-TYPE FLOW CONTROL DEVICE AND FLOW CONTROL METHOD

(71) Applicant: FUJIKIN INCORPORATED, Osaka (JP)

(72) Inventors: Katsuyuki Sugita, Osaka (JP); Kaoru Hirata, Osaka (JP); Nobukazu Ikeda, Osaka (JP); Kouji Nishino, Osaka (JP); Masahiko Takimoto, Osaka (JP); Takahiro Imai, Osaka (JP); Shinya Ogawa, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 557 days.

(21) Appl. No.: 16/499,174

(22) PCT Filed: Mar. 20, 2018

(86) PCT No.: PCT/JP2018/010944
§ 371 (c)(1),
(2) Date: Sep. 27, 2019

(87) PCT Pub. No.: WO2018/180745
PCT Pub. Date: Oct. 4, 2018

(65) Prior Publication Data
US 2020/0033895 A1  Jan. 30, 2020

(30) Foreign Application Priority Data

Mar. 28, 2017 (JP) .............................. JP2017-064014

(51) Int. Cl.
*G05D 7/06* (2006.01)
*G01F 1/36* (2006.01)
(Continued)

(52) U.S. Cl.
CPC ............. *G05D 7/0635* (2013.01); *G01F 1/36* (2013.01); *G01F 1/363* (2013.01); *G01F 15/003* (2013.01);
(Continued)

(58) Field of Classification Search
CPC .......... G05D 7/0635; G05D 7/06; G01F 1/36; G01F 1/363; G01F 1/42; G01F 15/003; G01F 15/005; G05B 11/42
See application file for complete search history.

(56) References Cited

U.S. PATENT DOCUMENTS

2017/0060143 A1* 3/2017 Ding ...................... G01F 1/363

FOREIGN PATENT DOCUMENTS

JP  H05-241666 A  9/1993
JP  6-19557 A  * 1/1994
(Continued)

OTHER PUBLICATIONS

Translation of JP 6-19557-A (Year: 1994).*
(Continued)

*Primary Examiner* — Patrick C Williams
(74) *Attorney, Agent, or Firm* — Studebaker & Brackett PC

(57) ABSTRACT

A pressure-type flow rate control device includes a restriction part; a control valve provided upstream of the restriction part; an upstream pressure sensor for detecting pressure between the restriction part and the control valve; and an arithmetic processing circuit connected to the control valve and the upstream pressor sensor. The device is configured to perform flow rate control by controlling the control valve according to an output of the upstream pressure sensor. The arithmetic processing circuit performs an operation of closing the control valve in order to reduce a flow rate of a fluid flowing through the restriction part, and performs an opera-
(Continued)

tion of closing the control valve by feedback control in which a target value is an exponential function more gradual than the pressure drop characteristic data when a gas flows out of the restriction part.

7 Claims, 4 Drawing Sheets

(51) Int. Cl.
    *G01F 15/00*     (2006.01)
    *G05B 11/42*     (2006.01)
    *G01F 1/42*     (2006.01)
(52) U.S. Cl.
    CPC ............ *G01F 15/005* (2013.01); *G05B 11/42* (2013.01); *G01F 1/42* (2013.01); *G05D 7/06* (2013.01)

(56) References Cited

FOREIGN PATENT DOCUMENTS

| JP | 2000-122725 | A | * | 4/2000 | |
|---|---|---|---|---|---|
| JP | 3546153 | B2 | | 7/2004 | |
| WO | WO-2013134136 | A1 | * | 9/2013 | ............... F17D 5/00 |

OTHER PUBLICATIONS

Translation of 2000-122725 A (Year: 2000).*
International Search Report issued in PCT/JP2018/010944; dated May 15, 2018.

\* cited by examiner (a)

(b)

PRESSURE-TYPE FLOW CONTROL DEVICE AND FLOW CONTROL METHOD

TECHNICAL FIELD

The present invention relates to a pressure-type flow rate control device and a flow rate control method, and more particularly, to a pressure-type flow rate control device and a flow rate control method configured to appropriately change a control flow rate to a smaller flow rate.

BACKGROUND ART

Various types of flow meters and flow rate control devices for controlling the flow rate of fluids such as raw material gases and etching gases are used in semiconductor manufacturing equipment and chemical plants. Among these, a pressure-type flow rate control device can control the flow rate of various fluids with high accuracy by a relatively simple mechanism, for example, a combination of a piezo element driven control valve and a restriction part (orifice plate or critical nozzle).

In some pressure-type flow rate control devices, flow rate control is performed based on the principle that the flow rate is determined by an upstream pressure P1 regardless of an downstream pressure P2 when the critical expansion condition P1/P2≥about 2 is satisfied, where P1 is a gas pressure upstream of the restriction part (upstream pressure), and P2 is a gas pressure downstream of the restriction part (downstream pressure). In this type of the pressure-type flow rate control device, the flow rate of gas flowing to the downstream side of the restriction part can be controlled with high accuracy by only controlling the upstream pressure P1 using a pressure sensor and a control valve. In addition, a pressure-type flow rate control device with a pressure sensor also being provided downstream of the restriction part is known. When the downstream pressure sensor is provided, the flow rate can be calculated even when the difference between the upstream pressure P1 and the downstream pressure P2 is small and the critical expansion condition is not satisfied.

CITATION LIST

Patent Literature

Patent Document 1: Japanese Laid-Open Patent Publication No. H5-241666
Patent Document 2: Japanese Patent No. 3546153

SUMMARY OF INVENTION

Technical Problem

The pressure-type flow rate control device controls the flow rate by feedback-controlling the control valve so that the upstream pressure P1 output from the upstream pressure sensor becomes a pressure value corresponding to a desired flow rate.

However, when the control flow rate is changed to a smaller flow rate, for example, from 100% flow rate to 5% flow rate, the present inventor found that the control valve may be completely closed in order to rapidly reduce the upstream pressure P1, and thereafter the closed state of the control valve may continue. When the upstream pressure P1 is maintained higher than the target pressure value even when the control valve is closed as described above, the change of the operation signal does not affect the upstream pressure P1 at all, even though the operation signal by a feedback controller is changing to the valve closing direction. Therefore, even if the control valve is opened again to obtain a desired flow rate, for example, 5% flow rate, a time delay occurs to return an operation signal to the control valve, and a larger undershoot occurs in the feedback controller than originally supposed for the linear control object.

On the other hand, in order to avoid sudden change of the upstream pressure P1, it is conceivable to gradually close the control valve at a constant speed by continuously changing the flow rate target value at a constant speed (ramp control). However, in this case, a problem has been found that the responsiveness is deteriorated, because a relatively long time is required for the transition of the target flow rate value, in order to prevent the undershoot described above.

In recent years, flow rate control devices have been required to be applied to, for example, ALDs (Atomic Layer Deposition), and such applications require high-speed (very short cycle) pulsed gas supply. Therefore, good response is demanded for flow rate control even in the pressure-type flow rate control device, and it is difficult to apply the conventional pressure-type flow rate control device to such an application in some cases.

Patent Document 1 discloses an operation of rapidly opening and closing a valve at first and then slowly opening and closing the valve from the middle in order to prevent overshoot and undershoot. However, Patent Document 1 does not mention the method of controlling the control valve according to the upstream pressure P1 as in the pressure-type flow rate control device, and does not disclose how to control the actual control valve in the pressure-type flow rate control device.

The present invention has been made in view of the above-described problems, and its main object is to provide a pressure-type flow rate control device and a flow rate control method capable of performing flow rate control with high responsiveness while suppressing the occurrence of undershoot.

Solution to Problem

A pressure-type flow rate control device according to an embodiment of the present invention is a pressure-type flow rate control device comprising: a restriction part; a control valve provided upstream of the restriction part; an upstream pressure sensor for detecting a pressure between the restriction part and the control valve; and an arithmetic processing circuit connected to the control valve and the upstream pressure sensor, and is configured to perform flow rate control by controlling the control valve according to an output of the upstream pressure sensor, wherein the arithmetic processing circuit is configured to perform an operation of closing the control valve when an operation of closing the control valve needs to be performed to reduce a flow rate of a fluid flowing through the restriction part, and to perform an operation of closing the control valve by feedback control in which a target value is an exponential function more gradual than pressure drop characteristic data when gas flows out of the restriction part.

In an embodiment, the pressure drop characteristic data is data indicative of an exponential decay of a time constant $\tau$ expressed as $Y(t)=P_0 \cdot \exp(-t/\tau)$ at time t, initial pressure $P_0$, and the operation of closing the control valve is performed by feedback controlling the control valve to conform to the target value P(t) of the upstream pressure fall according to $P(t)=(P_0-P_x)\cdot\exp(-t/\tau')+P_x$, where $P_x$ is a target convergence value and the time constant $\tau'$ at $P(t)$ is greater than the time constant $\tau$ at $Y(t)$.

In an embodiment, the pressure drop characteristic data is data indicative of an exponential decay of a time constant $\tau$ expressed as $Y(t)=P_0\cdot\exp(-t/\tau)$ at time t, initial pressure $P_0$, and the operation of closing the control valve is performed by feedback controlling the control valve to conform to the target value $P(t)$ of upstream pressure fall according to $P(t)=\max(P_0\cdot\exp(-t/\tau'), P_x)$, where $P_x$ is a target convergence value and the time constant $\tau'$ at $P(t)$ is greater than the time constant $\tau$ at $Y(t)$.

In an embodiment, a different value is used for the time constant $\tau'$ of the $P(t)$ between a time constant up to a predetermined time and a time constant after the predetermined time.

A flow rate control method according to an embodiment of the present invention is a flow rate control method performed in a pressure-type flow rate control device comprising a restriction part; a control valve provided upstream of the restriction part; and an upstream pressure sensor for detecting a pressure between the restriction part and the control valve, the flow rate control method including a step of setting a flow rate target value so as to follow an exponential function more gradual than the pressure drop characteristic data when a gas flows out of the restriction part; and a step of reducing a flow rate by feedback controlling the control valve according to the set flow rate target value.

A flow rate control method according to an embodiment of the present invention is a flow rate control method performed in a plurality of pressure-type flow rate control devices, wherein each of the plurality of pressure-type flow rate control devices comprises a restriction part; a control valve provided upstream of the restriction part; and an upstream pressure sensor for detecting a pressure between the restriction part and the control valve; and is configured to perform flow rate control by the flow rate control method including a step of comparing the pressure drop characteristic data measured by each of the plurality of pressure-type flow rate control devices to determine the slowest pressure drop characteristic data, and a step of reducing the flow rate in each of the plurality of pressure-type flow rate control devices using a common flow rate target value according to an exponential function more gradual than the slowest pressure drop characteristic data.

Advantageous Effects of Invention

According to the embodiments of the present invention, the flow rate control operation of the pressure-type flow rate control device can be appropriately performed when the flow rate changes to the smaller flow rate.

DESCRIPTION OF EMBODIMENTS

Embodiments of the present invention will be described below with reference to the drawings, but the present invention is not limited to the following embodiments.

Figure 1:
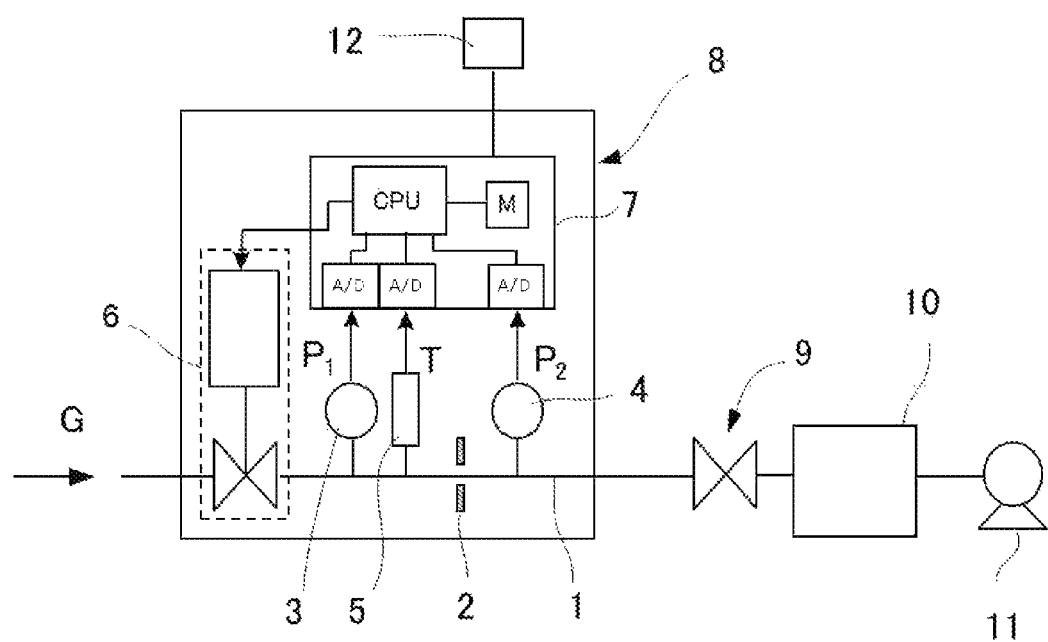
FIG. 1 is a schematic diagram showing a configuration of a pressure-type flow rate control device according to an embodiment of the present invention.

FIG. 1 is a diagram showing a configuration of a pressure-type flow rate control device 8 according to an embodiment of the present invention. The flow rate control device 8 includes a restriction part 2 (for example, an orifice plate) interposed in a flow path (gas supply path) 1 through which a fluid G passes; an upstream pressure sensor 3 and a temperature sensor 5 provided upstream of the restriction part 2; a downstream pressure sensor 4 provided downstream of the restriction part 2; and a control valve 6 provided upstream of the upstream pressure sensor 3.

The upstream pressure sensor 3 can measure an upstream pressure P1, which is the fluid pressure between the control valve 6 and the restriction part 2, and the downstream pressure sensor 4 can measure a downstream pressure P2, which is the fluid pressure between the restriction part 2 and a downstream valve 9.

The flow rate control device 8 also includes an arithmetic processing circuit 7 for controlling the opening and closing operation of the control valve 6 according to the outputs of the upstream pressure sensor 3 and the downstream pressure sensor 4. The arithmetic processing circuit 7 compares the set flow rate received from an external control device 12 with a calculated flow rate from outputs of the upstream and downstream pressure sensors 3 and 4, and controls the control valve 6 so that the calculated flow rate approaches the set flow rate.

Unlike the illustrated embodiment, the flow rate control device 8 may not include the downstream pressure sensor 4. In this case, the arithmetic processing circuit 7 is configured to calculate the flow rate according to the output from the upstream pressure sensor 3. In a preferred embodiment, the arithmetic processing circuit 7 is configured to correct the calculated flow rate according to a fluid temperature detected by the temperature sensor 5.

The flow rate control device 8 may include an inlet pressure sensor (not shown) for measuring the gas supply pressure upstream of the control valve 6. The inlet pressure sensor can measure the pressure of the gas supplied from a connected gas supply device, e.g. a raw material vaporizer, and can be used to control the gas supply quantity or the gas supply pressure.

As the restriction part 2, a critical nozzle or a sonic nozzle may be used instead of an orifice member such as an orifice plate. The diameter of the orifice or the nozzle is set to, for example, 10 μm to 500 μm. As the downstream valve 9, for example, a known air operated valve or the like in which supply of compressed air is controlled by a solenoid valve can be used. Further, an orifice built-in valve having an on/off valve disposed in the vicinity of the orifice member has been conventionally known, and the orifice built-in valve can be integrated with the restriction part 2 and the downstream valve 9 as one whole configuration to be incorporated into the flow rate control device.

The flow path 1 of the flow rate control device 8 may be configured by a pipe, or may be configured by a flow path hole formed in a metal block. The upstream and downstream pressure sensors 3, 4 may include, for example, a silicon single crystal sensor chip and a diaphragm. The control valve 6 may be, for example, a piezoelectric element driven diaphragm valve configured to open and close a valve mechanism including a metal diaphragm valve element using a drive mechanism such as a piezoelectric actuator.

In a fluid supply system including the flow rate control device 8, the upstream side of the control valve 6 is connected to a gas supply source such as a material gas, an etching gas, or a carrier gas, and the downstream side of the restriction part 2 is connected to a process chamber 10 of the semiconductor manufacturing equipment via the downstream valve 9. A vacuum pump 11 is connected to the process chamber 10, and typically, the inside of the process chamber 10 is evacuated when gas is supplied.

The flow rate control device 8 described above is a pressure-type flow rate control device, and performs flow rate control based on the principle that the flow rate is determined by the upstream pressure P1 when the critical expansion condition P1/P2≥about 2. When the critical expansion condition is satisfied, the flow rate Q downstream of the restriction part 2 is given by $Q=K_1 \cdot P1$, where $K_1$ is a constant depending on the type of fluid and the fluid temperature, and the flow rate Q is proportional to the upstream pressure P1 measured by the upstream pressure sensor 3. Furthermore, when the downstream pressure sensor 4 is provided, the flow rate can be calculated even when the difference between the upstream pressure P1 and the downstream pressure P2 is small and the above-mentioned critical expansion condition is not satisfied, and the flow rate Q can be calculated from the equation $Q=K_2 \cdot P2^m(P1-P2)^n$ (where $K_2$ is a constant depending on the type of the fluid and the fluid temperature, and m and n are indexes derived from the actual flow rate) according to the upstream pressure P1 and the downstream pressure P2 measured by the pressure sensors 3 and 4.

In order to perform flow rate control, the set flow rate set in the external control device 12 is sent from the external control device 12 to the arithmetic processing circuit 7. According to the outputs of the upstream pressure sensor 3 and the like, by using the flow rate calculating equation in the critical expansion condition or the non-critical expansion condition, the arithmetic processing circuit 7 calculates the calculated flow rate at any time, that is the measured value of the flow rate Q, from the above $Q=K_1 \cdot P1$ or $Q=K_2 \cdot P2^m(P1-P2)^n$, and feedback-controls the control valve 6 so that the flow rate of the fluid passing through the restriction part 2 approaches the set flow rate (that is, the difference between the calculated flow rate and the set flow rate approaches 0). The calculated flow rate may be output to the external control device 12 and displayed as a flow rate output value.

The arithmetic processing circuit 7 is typically built in the flow rate control device 8, but may be provided outside the flow rate control device 8. The arithmetic processing circuit 7 typically includes a CPU, a memory M such as a ROM or a RAM, an A/D converter, and the like, and may include a computer program configured to execute a flow rate control operation to be described later. The arithmetic processing circuit 7 may be a combination of hardware and software.

The arithmetic processing circuit 7 may be provided with an interface for exchanging information with an external device such as a computer, so that programs and data can be written from the external device to the ROM. All of the components (such as the CPU) of the arithmetic processing circuit 7 need not be integrally provided in the device, and some components such as the CPU may be arranged in another place (outside the device) and connected to each other by a bus. At this time, the inside of the device and the outside of the device may communicate not only by wire but also wirelessly.

Hereinafter, the operation of the flow rate control device 8 in the case of changing the control flow rate to the small flow rate side (at the time of a fall in flow rate) will be described. Hereinafter, all flow rate values of the set flow rate, the arithmetic flow rate, the target flow rate, and the like are expressed by a ratio in which the predetermined flow rate value is 100%. In consideration of the fact that the flow rate is proportional to the upstream pressure when the critical expansion condition is satisfied, the upstream pressure is expressed by a ratio of 100% when the flow rate value is 100%.

Figure 2:
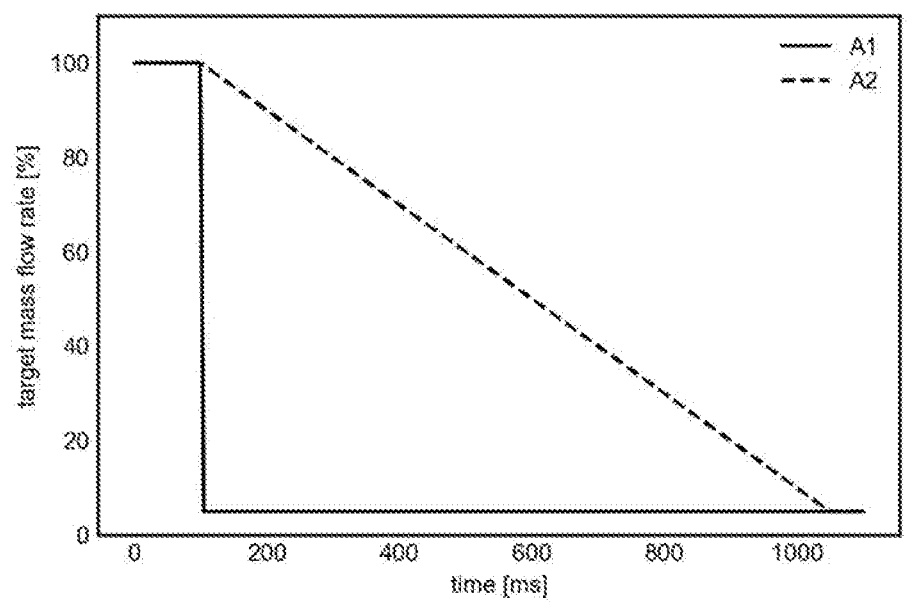
FIG. 2(a) shows a flow target signal in a comparative example.
FIG. 2(b) shows a flow target signal in an example.
Figure 2:
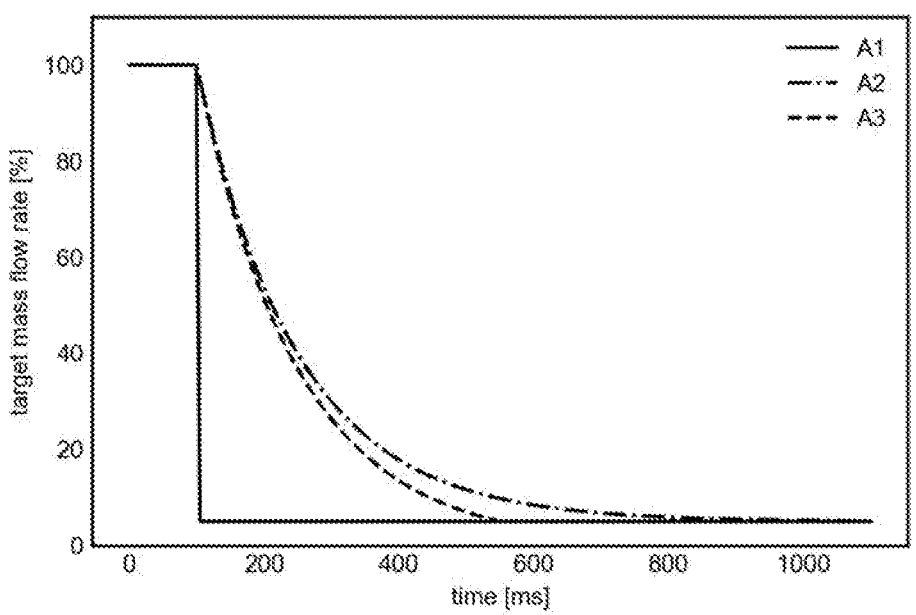

For example, when receiving a signal for changing the set flow rate from 100% to 5% (external flow rate setting signal A1 indicated by a solid line) as shown in FIGS. 2(a) and 2(b), the arithmetic processing circuit 7 sets a flow rate target value A2 indicated by a broken line (or an upstream pressure target value) in order to reduce the flow rate in response to the signal, and performs an operation of closing the control valve 6 by feedback control. The drive voltage of the control valve 6 changes at any time so that the difference between the calculated flow rate obtained from the output of the upstream pressure sensor 3 and the set target flow rate A2 becomes 0.

In this case, the arithmetic processing circuit 7 of the present embodiment does not perform the operation of reducing the flow rate target value A2 by the ramp control to close the control valve 6 as in the comparative example shown in FIG. 2(a), but performs the operation of reducing the flow rate target value A2 according to a predetermined exponential function as in the example shown in FIG. 2(b), that is, performs the operation of closing the control valve 6 by the first-order lag control.

Further, as the predetermined exponential function used for the flow rate target value A2 shown in FIG. 2(b), an exponential function more gradual (i.e., has a smaller slope) than the pressure drop characteristic data Y(t) of the upstream pressure P1 obtained by measurement in advance is used.

More specifically, when the pressure drop characteristics data Y(t) is given by the exponential function with the time constant τ expressed by $Y(t)=P_0 \cdot \exp(-t/\tau)$ where the initial pressure is $P_0$, in the present embodiment, the control valve 6 is feedback-controlled so as to conform to the upstream pressure target value P(t) in accordance with, for example, $P(t)=(P_0-P_x)\cdot \exp(-t/\tau')+P_x$ (where $P_x$ is the pressure corresponding to the flow target convergence value), and the time constant τ' at P(t) at this time is set to be greater than the time constant τ at Y(t), i.e., τ<τ'. This corresponds to adding a filter represented by, for example, $G(s)=1/(s+\tau)$ to the target value input stage of the feedback controller (where s is a complex number and G(s) is a transfer function), and the implementation is easy. Thus, by using P(t) as a function that is more gradual than the pressure drop characteristic data Y(t) and that rapidly converges to the flow rate target value, it is possible to suppress undershoot and rapidly reduce the flow rate target value.

Further, as indicated by a broken line as A3 in FIG. 2(b), $P_2(t)=\max(P_0 \cdot \exp(-t/\tau'), P_x)$ (where τ<τ') may be used as the target value of the upstream pressure. In the case of using this equation, because the value of $P_0 \cdot \exp(-t/\tau')$ or $P_x$, whichever is larger, is set as the target value, the target value does not fall below $P_x$, so that undershoot can be prevented, unnecessary delay does not occur even when the same equation is used at the time of flow rate rise, and even when the flow rate target convergence value is large, the control with the fastest response can be achieved.

Here, the pressure drop characteristic data $Y(t)$ will be described. The pressure drop characteristic data is, for example, data indicating a drop characteristic of the upstream pressure P1 generated when rapidly closing the control valve 6 when gas is flowing. The pressure drop characteristic data $Y(t)$ is preferably data obtained within a range in which the downstream pressure P2 is kept sufficiently smaller than the upstream pressure P1, and the critical expansion condition is satisfied. Since the flow rate is proportional to the upstream pressure when the critical expansion condition is satisfied, the upstream pressure P1 decays exponentially toward the pressure 0.

The pressure drop characteristic data $Y(t)$ can be obtained by, for example, closing the control valve with an initial control pressure of 100%, then measuring the pressure corresponding to the elapsed time by 20 points using the upstream pressure sensor 3 in the process of decreasing the flow rate, and plotting the pressure as a time function. The initial control pressure at the time of obtaining the pressure drop characteristic data $Y(t)$ is not limited to 100%, and may be 100% or less as long as a sufficient number of measurement samples can be obtained. Also, the number of measurement samples is not limited to 20 points, and may be a smaller number of samples (e.g., 3 points), as long as sufficient accuracy can be obtained. Of course, the number of samples may exceed 20 points.

In the pressure-type flow rate control device 8, even when the control valve 6 is rapidly closed, the gas flow rate does not instantaneously decreases to 0, and the flow rate decreases so as to attenuate with a decrease in the upstream pressure P1. This is because the gas accumulated between the control valve 6 and the restriction part 2 flows out through the restriction part 2, so that the flow rate decreases by the influence of the characteristics of the restriction part 2.

The time constant $\tau$ of the pressure drop characteristic data $Y(t)$ depends on, for example, the flow path volume between the control valve 6 and the restriction part 2, the orifice cross-sectional area, and the like, and can be obtained for each device by measuring the upstream pressure P1 when the control valve 6 is closed as described above using the upstream pressure sensor 3. The pressure drop characteristic data $Y(t)$ can be considered as data indicating the maximum pressure reduction rate in the device.

Therefore, in the pressure-type flow rate control device 8, it is impossible to reduce the flow rate or the upstream pressure more rapidly than the pressure drop characteristic data $Y(t)$ no matter how high the shut-off speed of the control valve 6 is increased. When a target value that drops more rapidly than the pressure drop characteristic data is set, the closed state of the control valve 6 continues in an attempt to reduce the upstream pressure P1. When such an uncontrolled state (the state in which the control valve 6 keeps closed because the target value falls below the pressure drop characteristic data) continues, even though the voltage of the instruction value from the feedback controller to the control valve 6 continues to transition to the valve closing direction, a situation that the control valve 6 does not change its closed state occurs, and becomes a cause of the occurrence of undershoot, particularly at a low set flow rate.

In consideration of the above points, in the present embodiment, when changing the flow rate to the smaller flow rate, the flow rate target value (or the upstream pressure target value) $P(t)$ is set so as to follow a more gradual or moderate exponential function, as compared with the pressure drop characteristic data $Y(t)$, so that the closed state of the control valve 6 does not occur. Here, more gradual means that $|dP(t_1)/dt|<|dY(t_2)/dt|$ is satisfied with respect to $t_1$ and $t_2$ satisfying $P(t_1)=Y(t_2)$. This makes it possible to suppress the occurrence of undershoot.

As described above, the pressure drop characteristic data $Y(t)$ is strictly different for each device. However, it has been found that pressure-type flow rate control devices made with the same design (same volume between the control valve and the restriction part, same orifice diameter) have almost the same characteristic data. Therefore, it is also possible to use a common pressure drop characteristic data $Y(t)$ for the pressure-type flow rate control devices of the same design.

On the other hand, it is also possible to apply the same exponential function control to a plurality of devices of the same design by using an exponential function which is sufficiently gradual with respect to the pressure drop characteristic data $Y(t)$ as a target value, so as to secure a margin capable of absorbing the characteristic difference for each device. However, since the responsiveness decreases as the margin increases, the exponential function is preferably set so as not to deviate too far from the pressure drop characteristic data $Y(t)$. The magnitude of the margin may be appropriately selected in consideration of the degree of occurrence of undershoot and required responsiveness, but the time constant $\tau'$ of the upstream pressure target value $P(t)$ is set to, for example, 100 to 150% (more specifically, 105 to 130%), with respect to the time constant $\tau$ of the pressure drop characteristic data $Y(t)$.

Further, as described above, when the same common exponential function control is used for a plurality of pressure-type flow rate control devices, the pressure drop characteristic data $Y(t)$ may be acquired in each pressure-type flow rate control device in advance, and the common target value $P(t)$ may be set with reference to the most gradual pressure drop characteristic data $Y(t)$ among the obtained pressure drop characteristic data $Y(t)$. The common target value $P(t)$ is set to an exponential function more gradual than the above-mentioned slowest pressure drop characteristic data $Y(t)$, and is set to be more gradual than the pressure drop characteristic data $Y(t)$ for the whole plurality of pressure-type flow rate control devices. Therefore, in all of the plurality of pressure-type flow rate control devices, the common target value $P(t)$ becomes dominant, the occurrence of undershoot is prevented, the difference in responsiveness between the devices can be eliminated, and the same flow rate control can be performed in the plurality of pressure-type flow rate control devices.

Figure 3:
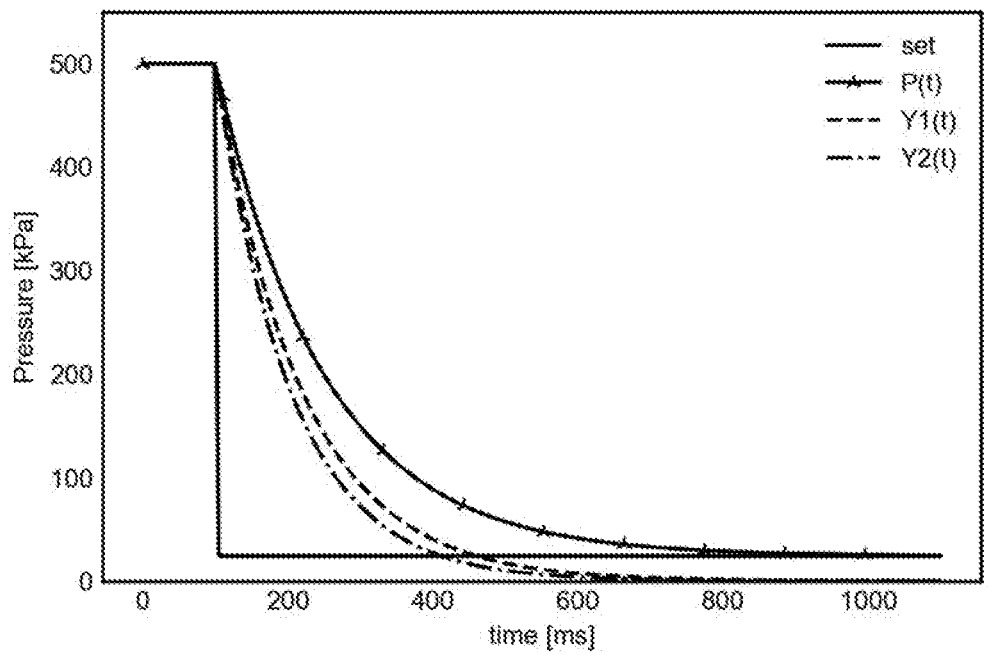
FIG. 3 is a graph showing an upstream pressure target value set more gradual than a plurality of pressure drop characteristic data.

FIG. 3 shows a target pressure $P(t)$ set for a plurality of pressure drop characteristic data $Y1(t)$, $Y2(t)$. As can be seen from FIG. 3, by setting the target rising pressure $P(t)$ to be more gradual than the slowest pressure drop characteristic data $Y2(t)$, it is possible to perform equivalent flow rate control in a plurality of pressure-type flow rate control devices. A solid line graph indicated by "set" in FIG. 3 indicates a setting signal input from an external device.

Further, although a mode in which a common target value $P(t)$ is used for the pressure-type flow rate control devices of the same design has been described above, for example, flow rate control may be performed using a common target value $P(t)$ for a plurality of pressure-type flow rate control devices having different orifice diameters or a single pressure-type flow rate control device having a plurality of flow paths having different orifice diameters. In this case as well, using the slowest pressure drop characteristic data $Y(t)$ as a reference, the common target value $P(t)$ which is more gradual than this may be set. This makes it possible to perform control in accordance with equivalent pressure drop characteristics while preventing the occurrence of undershoot.

Figure 4:
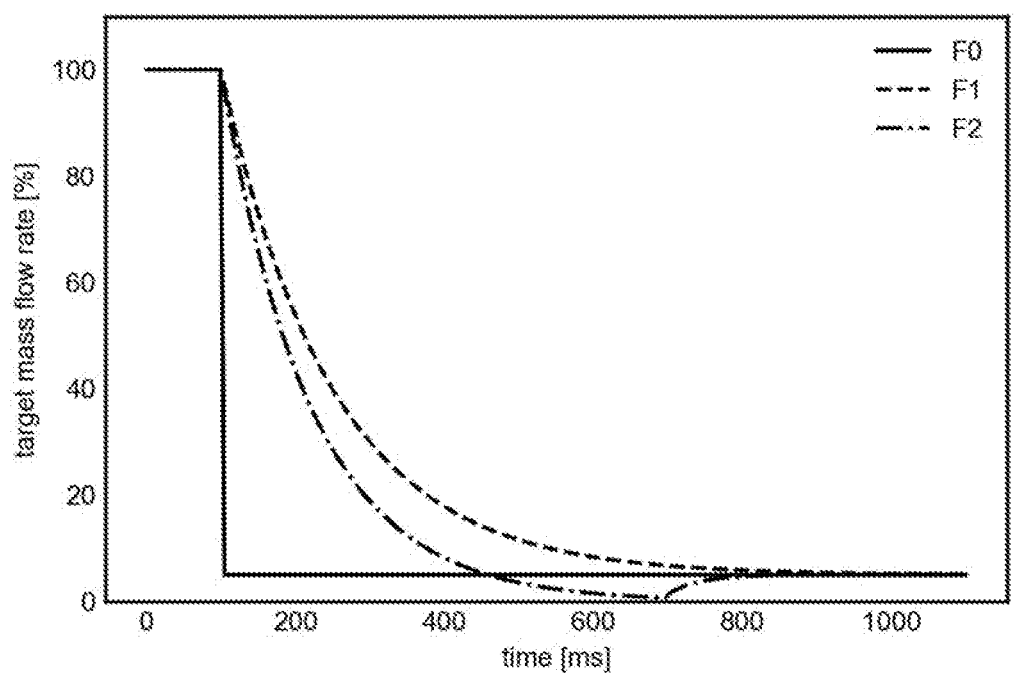
FIG. 4 is a diagram showing the actual change in flow rate when the control flow rate (set flow rate) is changed from 100% to 5% by the method shown in FIGS. 2(a) and (b).

FIG. 4 is a diagram showing actual flow rate changes when the flow rate is decreased from 100% to 5% by ramp control as in the comparative example shown in FIG. 2(a), and when the flow rate is decreased as in the embodiment shown in FIG. 2(b). In FIG. 4, a solid line F0 indicates a flow rate setting signal input from an external device, a broken line F1 indicates a case in which the flow rate is decreased according to the embodiment, and a dashed line F2 indicates a case in which the flow rate is decreased according to the comparative example.

As can be seen from the broken line F1 in FIG. 4, by performing control using the exponential flow rate target value set according to the pressure drop characteristic data Y(t), it is possible to prevent the occurrence of undershoot as shown by the dashed-dotted line F2 while maintaining good responsiveness.

Further, as described above, by performing flow rate control using an exponential function that is more gradual than the pressure drop characteristic data Y(t), it is possible to perform equivalent flow rate reduction control in any of the devices without causing a characteristic difference (machine difference) for each device in the pressure-type flow rate control devices of the same design. This is because the pressure drop characteristic data Y(t) is different for each device, and in the conventional control, a machine difference appears, since flow rate control is performed when the pressure drop characteristic data Y(t) is dominant over the flow rate, whereas according to the present embodiment, since the exponential function of the flow rate target value becomes dominant over the flow rate, the equivalent flow rate control can be performed in any device. As described above, according to the present embodiment, it is obvious that an effect of suppressing a difference in responsiveness particularly at the time of changing the flow rate to the smaller flow rate can be obtained.

A pressure-type flow rate control device configured to be able to execute a self-diagnosis function at the end of a process of a semiconductor manufacturing equipment (at the time of stopping a gas supply to a process chamber) or in a maintenance mode is well known, and a self-diagnosis method using a pressure drop characteristic when a control valve is changed from an open state to a closed state is well known (for example, Patent Document 2).

The pressure-type flow rate control device 8 of the present embodiment may also have a self-diagnosis mode, and the pressure drop characteristic data Y(t) may be acquired by measurement of the upstream pressure P1 in the self-diagnosis mode, and the flow rate target value in the fall time may be set so as to follow a more gradual exponential function using the acquired pressure drop characteristic data Y(t).

Similarly to the flow factor, the pressure drop characteristic data Y(t) is usually different for each type of gas. Here, the flow factor is an index indicating the relationship between the gas pressure and the ease of flow, which differs depending on the type of fluid. In the case of a gas with a small flow factor, the pressure drop characteristic data deviates downward, (i.e., pressure drop is likely to occur). Therefore, using the pressure drop characteristic data measured in advance by the specific gas (for example, nitrogen gas), the pressure drop characteristic data of the target gas in consideration of the flow factor may be obtained, and the target flow rate value of the target gas may be set by using the pressure drop characteristic data. When the flow factor of nitrogen is 1, the specific flow factor of nitrogen is, for example, Ar=about 0.887, He=about 2.81, $H_2$=about 3.74, $O_2$=about 0.935, $N_2O$=about 0.765, and $NH_3$=1.236, and it is known that various values may be taken depending on the type of gas.

Regarding the method of flow rate control for each type of gas, it is possible to obtain pressure drop characteristic data for each type of gas using a flow factor as described in Patent Document 2, for example, and to perform a suitable flow rate reduction operation without causing undershoot for an arbitrary type of gas by setting a flow rate target value so as to follow a more gradual exponential function.

Figure 5:
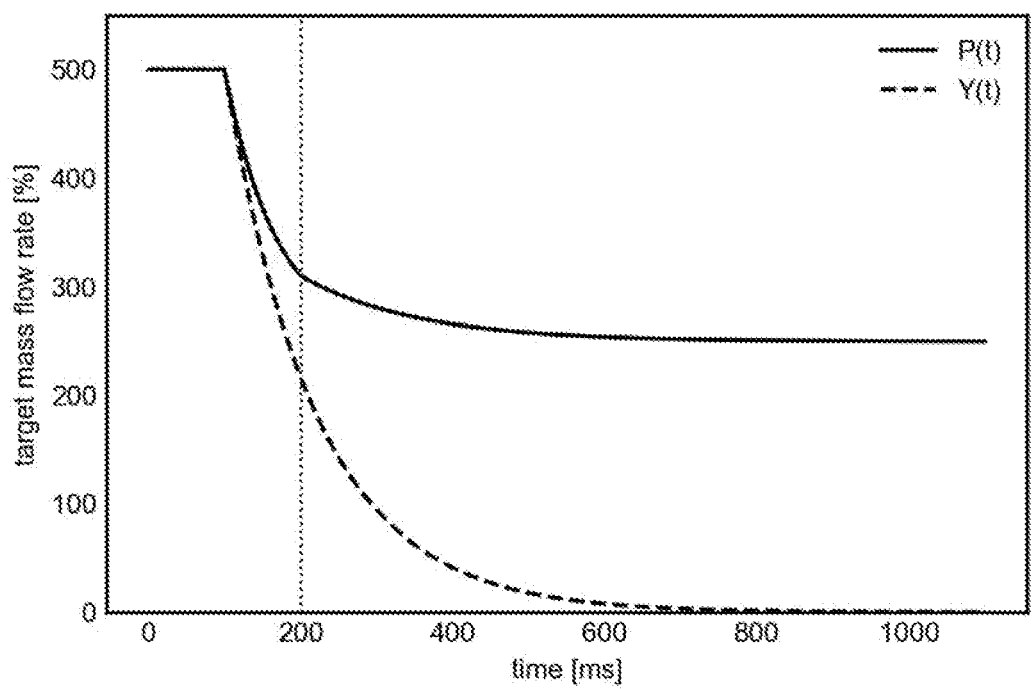
FIG. 5 is a graph showing a change in the target pressure when the time constant is changed for a predetermined period of time.

While embodiments of the present invention have been described above, various modifications are possible. For example, as the time constant τ' of the target pressure P(t), a different value may be used between the time constant up to the predetermined time and the time constant after the predetermined time. The change in the target pressure P(t) at this time is shown in FIG. 5. In this case, by setting the time constant after the elapse of a predetermined time (200 ms in the example shown in FIG. 5) to be relatively large, it is possible to more effectively prevent the occurrence of undershoot while maintaining high responsiveness.

INDUSTRIAL APPLICABILITY

According to the pressure-type flow rate control device or the flow rate control method according to the embodiments of the present invention, it is possible to reduce the flow rate with good response while suppressing the occurrence of undershoot. In addition, it is possible to eliminate a difference in responsiveness at the time of changing the flow rate to the small flow rate side.

REFERENCE SIGNS LIST

1 Flow path
2 Restriction part
3 Upstream pressure sensor
4 Downstream pressure sensor
5 Temperature sensor
6 Control valve
7 Arithmetic processing circuit
8 Pressure-type flow rate control device
9 Downstream valve
10 Process chamber
11 Vacuum pump
12 External control device

The invention claimed is:
1. A pressure-type flow rate control device comprising:
a restriction part;
a control valve provided upstream of the restriction part;
an upstream pressure sensor for detecting a pressure between the restriction part and the control valve; and
an arithmetic processing circuit connected to the control valve and the upstream pressure sensor,
wherein the flow rate is controlled by controlling the control valve according to an output of the upstream pressure sensor, and
the arithmetic processing circuit performs an operation of closing the control valve to reduce a flow rate of a fluid flowing through the restriction part by feedback control in which an exponential function more gradual than a pressure drop characteristic data of a gas flowing out of the restriction part is set as a target value, thereby performing an operation of closing the control valve, where the pressure drop characteristic data is data indicating a maximum pressure reduction rate in the device.

2. The pressure-type flow rate control device of claim 1, wherein the pressure drop characteristics data is data indicating exponential decay of a time constant $\tau$ represented by $Y(t)=P_0 \cdot \exp(-t/\tau)$ at time t and initial pressure $P_0$, and the operation of closing the control valve is performed by feedback controlling the control valve to conform to the target value $P(t)$ of the upstream pressure decreasing according to $P(t)=(P_0-P_x) \cdot \exp(-t/\tau')+P_x$, wherein $P_x$ is a target convergence value, and the time constant $\tau'$ at $P(t)$ is greater than the time constant $\tau$ at $Y(t)$.

3. The pressure-type flow rate control device according to claim 2, wherein different values of the time constant $\tau'$ of the $P(t)$ are used for a time constant up to a predetermined time and a time constant after the predetermined time.

4. The pressure-type flow rate control device of claim 1, wherein the pressure drop characteristic data is data indicating exponential decay of a time constant $\tau$ represented by $Y(t)=P_0 \cdot \exp(-t/\tau)$ at time t and initial pressure $P_0$, and the operation of closing the control valve is performed by feedback controlling the control valve to conform to the target value $P(t)$ of the upstream pressure decreasing according to $P(t)=\max(P_0 \cdot \exp(-t/\tau'), P_x)$, wherein $P_x$ is a target convergence value, and the time constant $\tau'$ at $P(t)$ is greater than the time constant $\tau$ at $Y(t)$.

5. The pressure-type flow rate control device according to claim 4, wherein different values of the time constant $\tau'$ of the $P(t)$ are used for a time constant up to a predetermined time and a time constant after the predetermined time.

6. A flow rate control method performed in a pressure-type flow rate control device including a restriction part; a control valve provided upstream of the restriction part; and an upstream pressure sensor for detecting a pressure between the restriction part and the control valve, the flow rate control method comprising the steps of:
obtaining a pressure drop characteristic data, where the pressure drop characteristic data is data indicating a maximum pressure reduction rate in the device;
setting a flow rate target value in accordance with an exponential function that is more gradual than the pressure drop characteristic data when gas flows out of the restriction part; and
reducing the flow rate by feedback controlling the control valve in accordance with the set flow rate target value.

7. A flow rate control method performed in a plurality of pressure-type flow rate control devices,
wherein each of the plurality of pressure-type flow rate control devices includes a restriction part; a control valve provided upstream of the restriction part; and an upstream pressure sensor for detecting a pressure between the restriction part and the control valve, and is configured to perform flow rate control by the flow rate control method according to claim 6,
the flow rate control method comprising the steps of:
comparing the pressure drop characteristic data measured by each of the plurality of pressure-type flow rate control devices to determine the slowest pressure drop characteristic data; and
reducing the flow rate in each of the plurality of pressure-type flow rate control devices using a common flow target value according to an exponential function that is more gradual than the slowest pressure drop characteristic data.

* * * * *